Patented Aug. 25, 1936

2,052,393

UNITED STATES PATENT OFFICE 2,052,393

PROTECTIVE COATING COMPOSITION AND METHOD OF PREPARING THE SAME

Ralph M. Freydberg, New York, N. Y., assignor to Materials Protector Corporation, New York, N. Y., a corporation of New Jersey No Drawing. Application February 16, 1935, Serial No. 6,835

4 Claims. (Cl. 134—17)

The present invention relates to a protective-coating composition and more particularly, to a liquid latex composition and to the method of preparing said composition.

One object of the invention is to provide a latex composition in liquid form suitable for use as a spray-coating compound for coating shoes and other articles and materials to protect them from soiling and damage or to preserve them against deterioration.

A further object of the invention is to provide a liquid latex coating composition capable of producing, when sprayed into or otherwise applied to an object, a protective film which possesses considerable strength yet can be readily peeled off or stripped from the objects or materials on which it is formed.

The above objects of the invention and other objects ancillary thereto will best be understood from the following description:

According to the present invention, liquid latex, as prepared on the plantation in the Far East, namely, a 60% dry rubber content latex is mixed thoroughly in a colloid mill with a colloid protector such as, casein, a filler, preferably a clay such as kaolin, a vulcanizing agent such as sulphur and zinc oxide, a putrefaction preventative such as thymol, an alkali, such as ammonium hydroxide, and water. This forms a master mix which is subsequently added to a quantity of liquid latex preferably of the same kind as that used in forming the master mix. The final composition is thus produced. Instead of latex, a water dispersion of a reclaimed or raw rubber can be used in the same proportion as the latex, and the other ingredients can be replaced by the substances hereinafter indicated used in the same proportions as said other ingredients.

The casein is employed as a colloid protector to prevent coagulation of the latex. In lieu of casein, karaya gum, gum arabic, gum tragacanth, glue, sea moss, soap, or sodium silicate may be employed. The quantity of casein may vary but, for good results, should be about 3% by weight of the master mix, but, as the casein has a tendency to weaken the film formed from this product, the quantity used should preferably not substantially exceed said proportion of 3%. The sulphur and zinc oxide, used together, tend to cause vulcanization of the film and thereby materially strengthen the latter and prolong its life. In lieu of sulphur, selenium may be used, and instead of zinc oxide, there may be utilized zinc stearate or any other zinc salt of a fatty acid, magnesium oxide or calcium oxide. The quantity of sulphur may vary from zero to a maximum of 12% by weight, and the quantity of zinc oxide may vary from zero to a maximum of 20% by weight. When used in the composition, these vulcanization ingredients are preferably employed in equal amounts. The thymol is employed for the purpose of preventing putrefaction of the latex which would otherwise occur due to the presence of proteins in the latex. Sodium benzoate, phenol or any similar organic preservative may be used instead of thymol. The quantity of thymol may vary from 0.10% to 1.0% by weight. The ammonium hydroxide is used in order to preserve the alkalinity of the composition and should be used in an amount sufficient to produce in the final product a hydrogen ion potential or pH not less than seven. Any alkali such as sodium hydroxide, potassium hydroxide or any alkali salt such as borax may be used instead of ammonium hydroxide. In lieu of kaolin, whiting, barytes, zinc sulphide, lithopone, titanium dioxide, titanox B, titanox C, may be used. The water is employed as a diluent.

In the preferred composition of the master mix the above mentioned ingredients are mixed together according to the following example:

|  | Kilograms |
|---|---|
| Casein | 3.250 |
| Kaolin | 16.100 |
| Sulphur | 1.625 |
| Zinc oxide | 1.625 |
| Thymol | 0.050 |
| Ammonium hydroxide, 26° Baumé | 0.250 |
| Water | 35.500 |
| Liquid latex (60% D. R. C.) | 59.520 |

This master mix is prepared as follows:

The ingredients are weighed carefully in the amounts indicated in the above preferred example and are placed in a colloid mill of standard type having an aperture of about three one-thousandths of one inch to produce a thoroughly wetted conglomerate mass or colloidal solution. The colloidal solution or master mix is subsequently added to 250 kg. of liquid latex (60% D. R. C.), of the same kind as that used in making the master mix, thus forming the final product of the present invention. The master mix should be added to said liquid latex slowly and carefully while slowly stirring the mixture. The master mix can be kept indefinitely without danger of coagulation of the latex. Preferably, the master mix is not incorporated with the additional latex until ready for shipment or use.

All containers, implements and utensils utilized for or in the manufacture of the present composition must be scrupulously clean and should preferably be non-metallic. If metal containers or implements are used they should not be made of any metal which is high in the electromotive series. The containers carrying the present composition therein should be well sealed against the entrance of air.

The liquid latex composition thus prepared is applied to the articles or materials as a protective film or coating preferably by spraying. The films thus formed on the objects or materials are strong and enduring but can be peeled off when desired. This composition is especially suitable for spraying on shoes and parts thereof, particularly shoe uppers, to protect the same against soiling and damages during the manufacture of the shoes. It will be understood, however, that the composition is not restricted to the use for coating shoes or other articles or materials but may be employed generally for other purposes known in the art.

Having thus described the invention, what I claim is:

1. A liquid coating composition comprising the following ingredients substantially in the proportions specified:

| | Kilograms |
|---|---|
| 60% D. R. C. liquid latex | 59.520 |
| Casein | 3.250 |
| Kaolin | 16.100 |
| Thymol | 0.050 | and water in proportion to the fluidity desired.

2. A liquid coating composition comprising the following ingredients substantially in the proportions specified:

| | Kilograms |
|---|---|
| 60% D. R. C. liquid latex | 59.520 |
| Casein | 3.250 |
| Kaolin | 16.100 |
| Thymol | 0.050 |
| Ammonium hydroxide 26° Baumé | 0.250 | and water in proportion to the fluidity desired.

3. A liquid coating composition comprising the following ingredients substantially in the proportions specified:

| | Kilograms |
|---|---|
| 60% D. R. C. liquid latex | 59.520 |
| Casein | 3.250 |
| Kaolin | 16.100 |
| Thymol | 0.050 |
| Ammonium hydroxide 26° Baumé | 0.250 |
| Sulphur | 1.625 |
| Zinc oxide | 1.625 | and water in proportion to the fluidity desired.

4. A liquid coating composition comprising the following ingredients substantially in the proportions specified:

| | Kilograms |
|---|---|
| 60% D. R. C. liquid latex | 309.520 |
| Casein | 3.250 |
| Kaolin | 16.100 |
| Sulphur | 1.625 |
| Zinc oxide | 1.625 |
| Thymol | 0.050 |
| Ammonium hydroxide 26° Baumé | 0.250 |
| Water | 35.500 |

RALPH M. FREYDBERG.